(12) United States Patent
Yoon

(10) Patent No.: US 11,892,414 B2
(45) Date of Patent: Feb. 6, 2024

(54) DEVICE AND METHOD FOR CHECKING FOR SURFACE DEFECT, USING IMAGE SENSOR

(71) Applicant: VIEW-ON LTD., Seoul (KR)

(72) Inventor: Young Yeop Yoon, Pyeongtaek-si (KR)

(73) Assignee: VIEW-ON LTD., Seoul (KR)

( * ) Notice: Subject to any disclaimer, the term of this patent is extended or adjusted under 35 U.S.C. 154(b) by 490 days.

(21) Appl. No.: 17/263,818

(22) PCT Filed: Jun. 26, 2019

(86) PCT No.: PCT/KR2019/007703
§ 371 (c)(1),
(2) Date: Jan. 27, 2021

(87) PCT Pub. No.: WO2020/027440
PCT Pub. Date: Feb. 6, 2020

(65) Prior Publication Data
US 2021/0302324 A1    Sep. 30, 2021

(30) Foreign Application Priority Data
Aug. 1, 2018   (KR) .................. 10-2018-0089808

(51) Int. Cl.
*G01N 21/88* (2006.01)
*G06T 7/00* (2017.01)

(52) U.S. Cl.
CPC ..... *G01N 21/8806* (2013.01); *G01N 21/8851* (2013.01); *G06T 7/0006* (2013.01);
(Continued)

(58) Field of Classification Search
CPC .......... G01N 21/8851; G01N 21/8806; G01N 21/95; G01N 21/8901; G01N 2021/8887;
(Continued)

(56) References Cited

U.S. PATENT DOCUMENTS

| 5,032,735 A * | 7/1991 | Kobayashi ........... G01R 31/309 |
| | | 250/559.34 |
| 9,002,094 B2 * | 4/2015 | Hirota .................. G06T 7/0002 |
| | | 382/141 |

(Continued)

FOREIGN PATENT DOCUMENTS

| JP | 2005-214720 A | 8/2005 |
| JP | 2009-097977 A | 5/2009 |

(Continued)

OTHER PUBLICATIONS

Shimoni et al "Illumination System for Object Inspection", May 6, 1999, WO9922224 A1 (Year: 1999).*

*Primary Examiner* — Sang H Nguyen
(74) *Attorney, Agent, or Firm* — NKL Law; Jae Youn Kim

(57) ABSTRACT

Proposed are a device and method for checking for a surface defect, using an image sensor. The device can increase accuracy in detecting defects of various types, shapes, or directions, and include: a frame part for providing a transport path of an object to be checked, along the lengthwise direction parallel to the ground surface; a transport part provided on one side of the frame part so as to transport the object to be checked, along the transport path; and an image sensor part provided in the middle of the transport path so as to capture an image of the surface of the object to be checked, from above the transported object to be checked.

5 Claims, 8 Drawing Sheets

(52) U.S. Cl.
CPC ............... *G01N 2021/8835* (2013.01); *G01N 2021/8887* (2013.01); *G01N 2201/0626* (2013.01); *G06T 2207/10152* (2013.01); *G06T 2207/30136* (2013.01); *G06T 2207/30141* (2013.01)

(58) Field of Classification Search
CPC .... G01N 2201/0626; G01N 2021/8835; G06T 7/0006; G06T 2207/10152; G06T 2207/30136
See application file for complete search history.

(56) References Cited

U.S. PATENT DOCUMENTS

| | | | | |
|---|---|---|---|---|
| 2005/0174571 | A1* | 8/2005 | Cochran | G01N 21/909 356/240.1 |
| 2005/0190361 | A1* | 9/2005 | Ishiba | G01R 31/309 356/237.2 |
| 2007/0206183 | A1* | 9/2007 | Lebens | G01N 21/95684 356/237.2 |
| 2009/0257050 | A1* | 10/2009 | Pertzov | G01N 21/8806 356/237.1 |
| 2010/0246174 | A1* | 9/2010 | Ido | G01N 21/8806 362/235 |
| 2012/0069339 | A1* | 3/2012 | Toyoda | G01N 21/95684 356/432 |
| 2012/0194806 | A1* | 8/2012 | Kuo | G01N 21/95 356/237.2 |
| 2015/0285745 | A1* | 10/2015 | Srocka | G01N 21/8901 356/237.5 |
| 2017/0191946 | A1* | 7/2017 | Smith | G07D 7/12 |

FOREIGN PATENT DOCUMENTS

| | | |
|---|---|---|
| JP | 2012-189479 A | 10/2012 |
| JP | 2013-074204 A | 4/2013 |
| KR | 20020015081 A | 2/2002 |
| KR | 10-0389967 B1 | 7/2003 |
| KR | 10-0470402 B1 | 2/2005 |
| KR | 10-2016-0121716 A | 10/2016 |

* cited by examiner

FIRST LIGHTING LAMP ON

SECOND LIGHTING LAMP ON

FOURTH LIGHTING LAMP ON

THIRD LIGHTING LAMP ON (a): SURFACE-DEFECTIVE PRODUCT (b-1): FIRST LIGHTING IMAGE  (b-2): SECOND LIGHTING IMAGE (b-3): THIRD LIGHTING IMAGE  (b-4): FOURTH LIGHTING IMAGE

DEVICE AND METHOD FOR CHECKING FOR SURFACE DEFECT, USING IMAGE SENSOR

CROSS-REFERENCE TO RELATED APPLICATIONS

This application is a national stage entry under 35 USC 371 of PCT/KR2019/007703, filed Jun. 26, 2019, which claims priority to KR10-2018-0089808, filed Aug. 7, 2018, the disclosure of which is incorporated by reference herein in its entirety.

TECHNICAL FIELD

The present invention relates to a device and method for inspecting a surface defect using an image sensor, and more specifically, to a device and method for inspecting a surface defect using an image sensor, which acquire a scanned image obtained by scanning the entire surface of a subject by photographing the surface of the subject using the image sensor while transporting the subject, are configured so that any one of a plurality of lighting lamps having different light irradiation directions is turned on in a predetermined order at each time of photographing to irradiate, with light, a photographing area photographed by the image sensor, can obtain the above-described scanned image for each of the plurality of lighting lamps having different light irradiation directions with just one scanning, and thus can improve the detection accuracy of defects having various types, shapes, or directions and significantly reduce a time required to inspect the surface of the subject.

BACKGROUND ART

In general, flat products such as steel plates, printed circuit board (PCB) substrates, semiconductor wafers, and films go through a surface inspection process of evaluating whether defects such as contamination, scratches, imprints, and cracks formed on the surfaces of the products are present after a manufacturing process is completed.

In the related art, a surface inspection process is generally performed in a manner in which an inspector directly inspects the surfaces of the products using his or her eyes or a microscope, but in the case of the visual inspection, the defects are determined by subjective judgment by inspector's visual observation. Thus, since it is difficult to secure the reliability for uniform quality, the surface inspection process cannot be applied to surface inspection of secondary batteries, semiconductor wafers, PCB substrates, and the like in which minute surface defects have a fatal effect on quality.

In order to solve this problem, in recent years, a surface inspection device has been developed which determines whether a defect is present on the surface of a product using a light source that irradiates the surface of the product to be inspected with light and an image sensor that photographs an image by reflected light reflected from the surface of the product. The surface inspection device using an image sensor is disclosed in detail in Korean Patent No. 10-0389967 (published on Feb. 27, 2002).

However, in the case of surface defects, types, shapes, and directions of the defects that can be detected through the output of the image sensor change depending on the direction in which light is irradiated. Thus, when a method of uniformly irradiating an inspection surface with light is applied as in a technology according to Korean Patent No. 10-0389967, it is difficult to accurately detect surface defects having various types, shapes, or directions.

To solve this problem, Korean Patent No. 10-0470402 (published on Jul. 24, 2002) discloses a method of improving the accuracy of surface inspection by capturing images while irradiating light in different directions in a state in which two light sources are installed on left and right sides of a transferring subject.

However, in the case of Korean Patent No. 10-0470402, due to the limitation of an arrangement structure of a line-type light source, the light can be irradiated only in two directions from the front and rear of a scan line of a line scan-type image sensor. Thus, this technology still has the problem of the related art in that it is difficult to accurately detect all surface defects having various types, shapes, or directions.

Further, in the case of Korean Patent No. 10-0470402, since the line scan-type image sensor is used, a scanning speed is low, and since duplicate scanning is performed for each scan line while two light sources are alternately turned on, an excessive amount of time is consumed in inspecting the entire surface of the subject. These problems are further aggravated when the subject has a large area and total inspection is required due to product characteristics, such as in secondary batteries for electric vehicles.

DISCLOSURE

Technical Problem

The present invention is directed to providing a device and method for inspecting a surface defect using an image sensor, which acquire a scanned image obtained by scanning the entire surface of a subject by photographing the surface of the subject using the image sensor while transporting the subject, are configured so that any one of a plurality of lighting lamps having different light irradiation directions is turned on in a predetermined order at each time of photographing to irradiate, with light, a photographing area photographed by the image sensor, can obtain the above-described scanned image for each of the plurality of lighting lamps having different light irradiation directions with just one scanning, and thus can improve the detection accuracy of defects having various types, shapes, or directions and significantly reduce a time required to inspect the surface of the subject.

Technical Solution

One aspect of the present invention provides a device for inspecting a surface defect using an image sensor, the device including a frame part that provides a transport path of a subject in a lengthwise direction parallel to the ground; a transport part installed on one side of the frame part to transport the subject along the transport path, an image sensor unit installed in a middle of the transport path to photograph a surface of the subject from an upper side of the transported subject, a lighting unit including a plurality of lighting lamps, which irradiate a photographing area, which is an area belonging to the surface of the subject and photographed by the image sensor unit, with light in different directions and installed in the middle of the transport path, and a controller that controls operations of the transport part and the image sensor unit so that the photographing area is changed by a predetermined unit transport distance at each photographing by photographing the surface of the subject while moving the subject by the unit transport distance, wherein the controller controls an operation of the lighting unit so that any one of the plurality of lighting lamps is turned on in a predetermined order when the image sensor unit performs the photographing and thus irradiates each photographing area consecutively photographed with each other with light in different directions.

The lighting unit may include a first lighting module including a plurality of lighting lamps configured to irradiate the photographing area with light from a front side of the image sensor unit and installed in the middle of the transport path, a second lighting module including a plurality of lighting lamps configured to irradiate the photographing area with light from a rear side of the image sensor unit and installed in the middle of the transport path, and a lighting controller configured to turn on the plurality of lighting lamps included in the first lighting module and the second lighting module in a predetermined order by a control signal from the controller, the plurality of lighting lamps provided in the first lighting module may be arranged to have different horizontal incidence angles that are angles between directions in which the lighting lamps irradiate light and a transport direction of the subject, and the plurality of lighting lamps provided in the second lighting module may be arranged to have different horizontal incidence angles.

The first lighting module may include a first lighting module side lamp fastening member that has a sawtooth shape in which a first inclined surface and a second inclined surface facing the photographing area are serially connected to each other in a width direction of the frame part and is installed on one front side of the image sensor unit, a first lighting lamp including a plurality of light-emitting diode (LED) light sources that are each coupled to the first inclined surface, and a second lighting lamp including a plurality of LED light sources that are each coupled to the second inclined surface, and the second lighting module may include a first lighting module lamp that has a sawtooth shape, in which a third inclined surface and a fourth inclined surface facing the photographing area are serially connected to each other in the width direction of the frame part, and is installed on one rear side of the image sensor unit, a third lighting lamp including a plurality of LED light sources that are each coupled to the third inclined surface, and a fourth lighting lamp including a plurality of LED light sources that are each coupled to the fourth inclined surface.

The lighting unit may include a first lighting module including a plurality of lighting lamps configured to irradiate the photographing area with light from a front side of the image sensor unit, a second lighting module including a plurality of lighting lamps configured to irradiate the photographing area with light from a rear side of the image sensor unit and installed in the middle of the transport path, and a lighting controller configured to turn on the plurality of lighting lamps included in the first lighting module and the second lighting module in a predetermined order by a control signal from the controller, and the plurality of lighting lamps provided in the first lighting module may be arranged to have different vertical incidence angles that are angles between directions in which the lighting lamps irradiate light and a direction in which the image sensor unit photographs the surface of the subject, and the plurality of lighting lamps provided in the second lighting module may also be arranged to have different vertical incidence angles.

The plurality of lighting lamps provided in the first lighting module may be arranged to have different horizontal incidence angles that are angles between the directions in which the lighting lamps irradiate light and the transport direction of the subject, and the plurality of lighting lamps provided in the second lighting module may also be arranged to have different horizontal incidence angles.

The first lighting module may include a first lamp fastening member that has a sawtooth shape in which a first inclined surface and a second inclined surface facing the photographing area are serially connected to each other in a width direction of the frame part and is installed on one front side of the image sensor unit, a second lamp fastening member that has the same structure as the first lamp fastening member and is installed on one front side of the image sensor unit to be spaced apart from the first lamp fastening member, a first lighting lamp including a plurality of LED light sources that are each coupled to the first inclined surface of the first lamp fastening member, and a second lighting lamp including a plurality of LED light sources that are each coupled to the second inclined surface of the second lamp fastening member, and the second lighting module may include a third lamp fastening member that has a sawtooth shape in which a third inclined surface and a fourth inclined surface facing the photographing area are serially connected to each other in the width direction of the frame part and is installed on one rear side of the image sensor unit, a fourth lamp fastening member that has the same structure as the third lamp fastening member and is installed on one rear side of the image sensor unit to be spaced apart from the third lamp fastening member, a third lighting lamp including a plurality of LED light sources that are each coupled to the third inclined surface of the third lamp fastening member, and a fourth lighting lamp including a plurality of LED light sources that are each coupled to the fourth inclined surface of the fourth lamp fastening member.

The unit transport distance may be determined as a value obtained by dividing a length of the photographing area in the transport direction of the subject by the number of the lighting lamps included in the first lighting module and the second lighting module.

The controller may acquire a scanned image of the entire surface of the subject by sequentially synthesizing photographed images obtained when a corresponding lighting lamp is turned on for each of the plurality of lighting lamps, and may determine whether a defect is present on the surface of the subject using the scanned image obtained for each of the plurality of lighting lamps.

Another aspect of the present invention provides a method of inspecting a surface defect using an image sensor and a plurality of lighting lamps installed in a middle of a transport path of a subject, the method including the steps of (a) transporting the subject by a predetermined unit transport distance along the transport path, (b) irradiating, with light, a photographing area that is an area belonging to a surface of the subject and photographed by the image sensor by turning on any one of the plurality of lighting lamps in a predetermined order, (c) photographing the photographing area from an upper side of the subject using the image sensor, (d) repeatedly performing steps (a) to (c) until the entire surface of the subject is completely photographed, (e) acquiring a scanned image obtained by scanning the entire surface of the subject by sequentially synthesizing the photographed image obtained when a corresponding lighting lamp is turned on for each of the plurality of lighting lamps using the photographed image obtained in step (d), and (f) determining whether a defect is present on the surface of the subject using the scanned image acquired for each of the plurality of lighting lamps, wherein the plurality of lighting lamps irradiate the photographing area with light in different directions.

Advantageous Effects

A device and method for inspecting a surface defect using an image sensor according to the present invention acquire a scanned image obtained by scanning the entire surface of the subject by photographing the surface of the subject using the image sensor while transporting the subject, are configured so that any one of the plurality of lighting lamps having different light irradiation directions is turned on in a predetermined order at each time of photographing to irradiate, with light, a photographing area photographed by the image sensor, can obtain the scanned image of the entire surface of the subject for each of the plurality of lighting lamps when the corresponding lighting lamp is turned on, and thus can improve the detection accuracy of defects having various types, shapes, or directions.

Further, the device and method for inspecting a surface defect using an image sensor according to the present invention are configured such that the entire surface of the subject is scanned when any one of the plurality of lighting lamps having different light irradiation directions is turned on in a predetermined order at each time of photographing of the image sensor. Thus, unlike the related art in which duplicated scanning is performed for a plurality of light sources, since the scanned image can be obtained for each of the plurality of lighting lamps having different light irradiation directions with only one scanning, a time consumed in inspecting the surface of the subject requiring total inspection and having a large area like secondary batteries for automobiles can be significantly reduced.

MODES OF THE INVENTION

Hereinafter, exemplary embodiments of the present invention will be described in detail with reference to the accompanying drawings.

Figure 1:
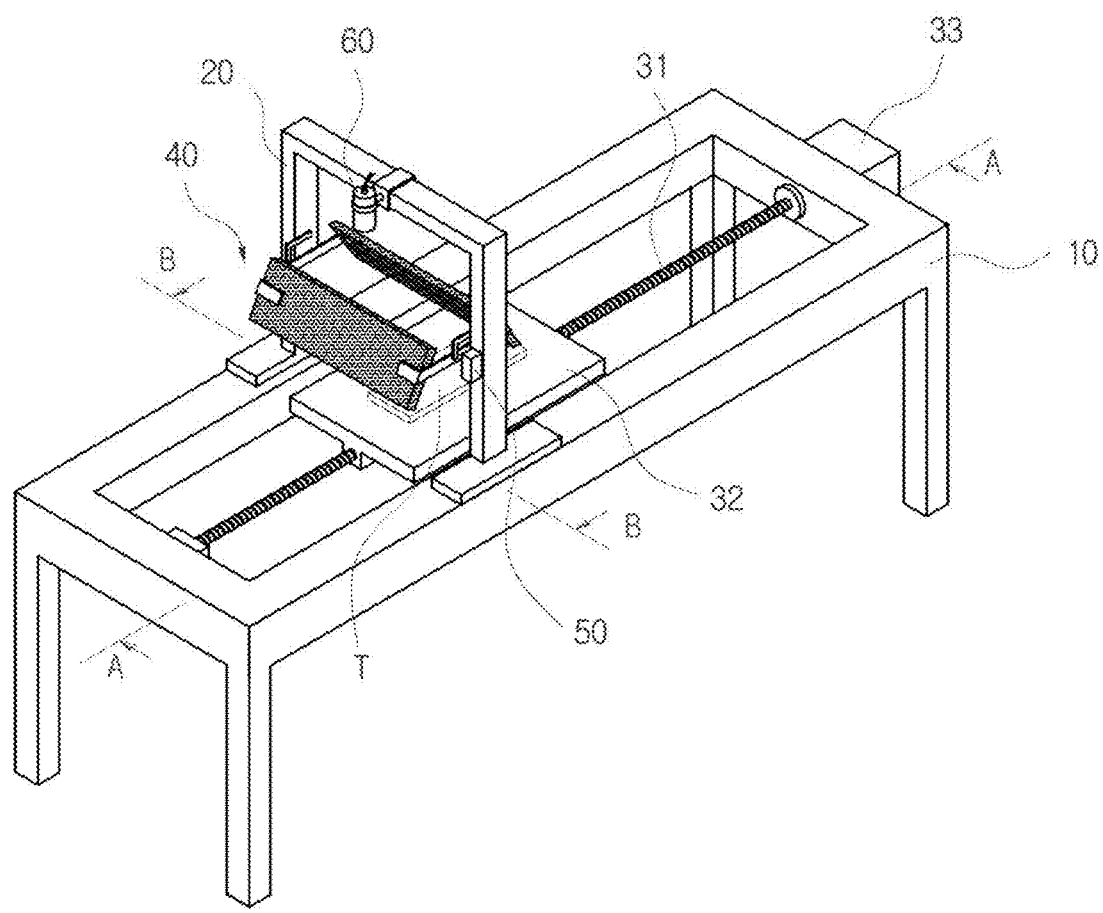
FIG. 1 is a perspective view for describing an entire configuration of a device for inspecting a surface defect using an image sensor according to an embodiment of the present invention.
Figure 2:
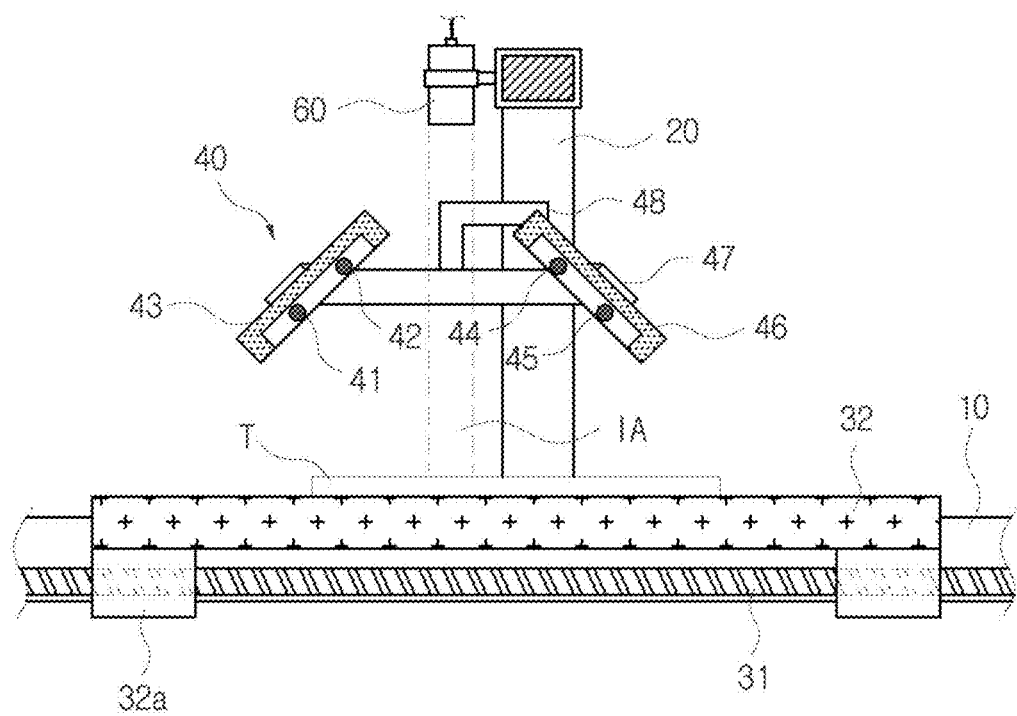
FIG. 2 is a cross-sectional view taken along line A-A of FIG. 1 for describing a configuration of a lighting unit.
Figure 3:
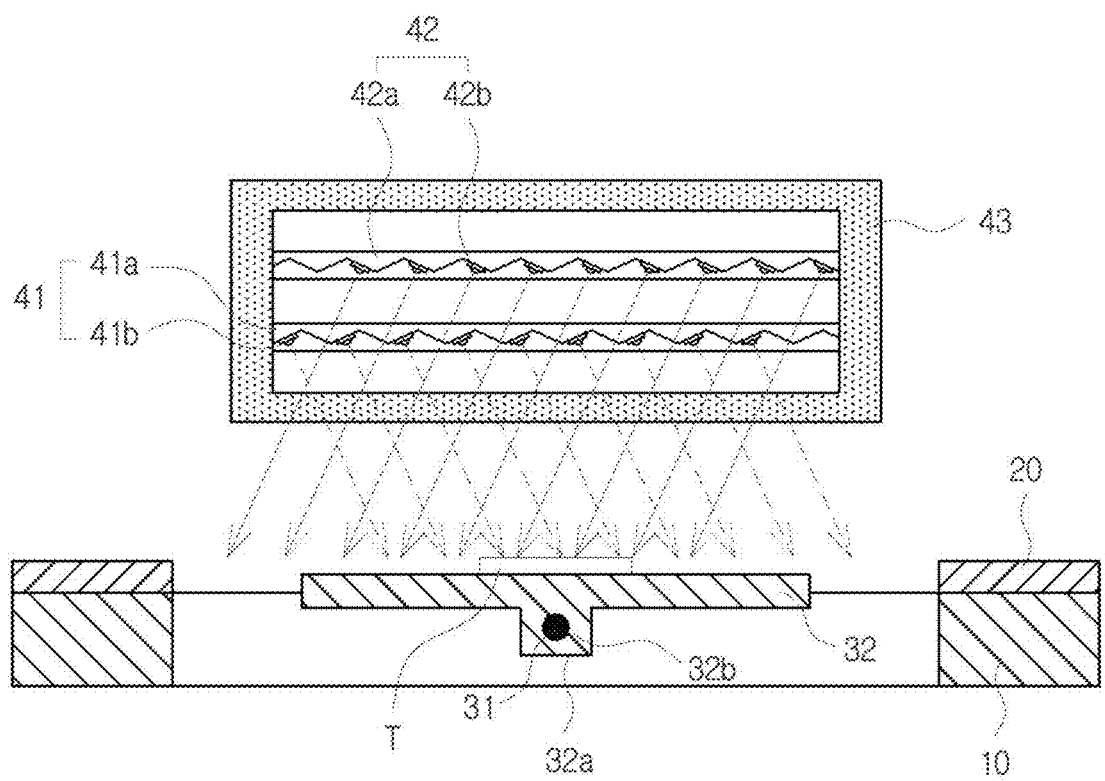
FIG. 3 is a cross-sectional view taken along line B-B of FIG. 1 for describing another modified example of the lighting unit.
Figure 4:
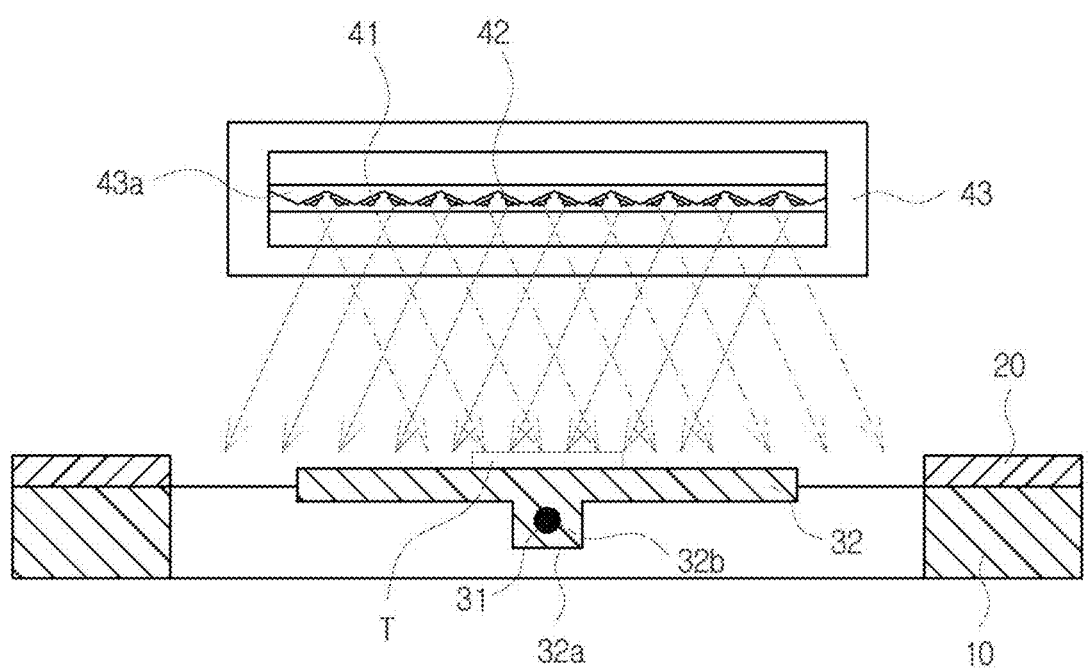
FIG. 4 is a cross-sectional view taken along line B-B of FIG. 1 for describing still another modified example of the lighting unit.

FIG. 1 is a perspective view for describing an entire configuration of a device for inspecting a surface defect using an image sensor according to an embodiment of the present invention, FIG. 2 is a cross-sectional view taken along line A-A of FIG. 1 for describing a configuration of a lighting unit, and FIGS. 3 and 4 are cross-sectional views taken along line B-B of FIG. 1 for describing another modified example of the lighting unit.

Figure 5:
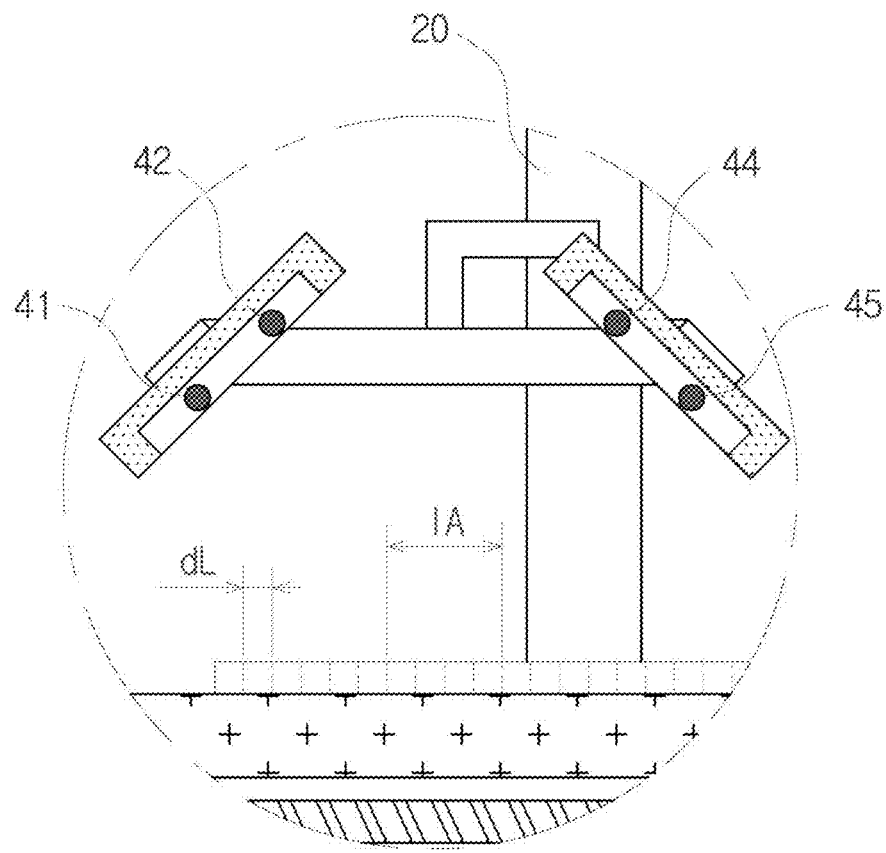
FIG. 5 is an enlarged view for describing a configuration of a lighting module installed in the device for inspecting a surface defect using an image sensor illustrated in FIG. 1.
Figure 6:
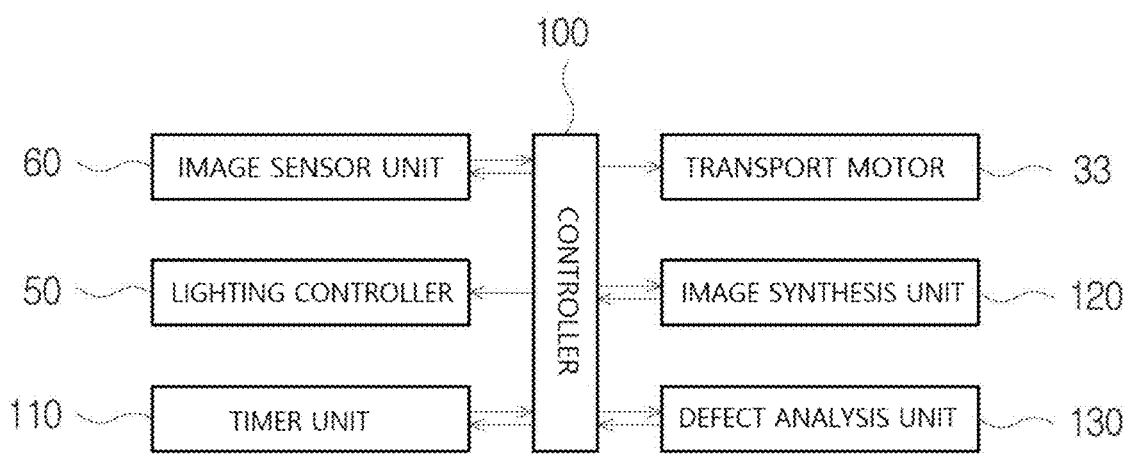
FIG. 6 is a block diagram for describing an operational configuration of the device for inspecting a surface defect using an image sensor illustrated in FIG. 1.
Figure 7A:
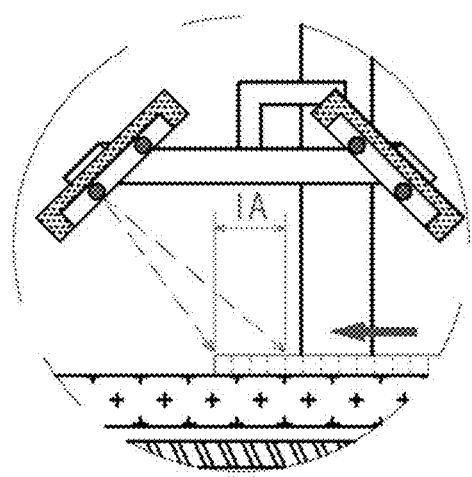
FIGS. 7A-7D are views for describing an operation of the lighting module installed in the device for inspecting a surface defect using an image sensor illustrated in FIG. 1.
Figure 7B:
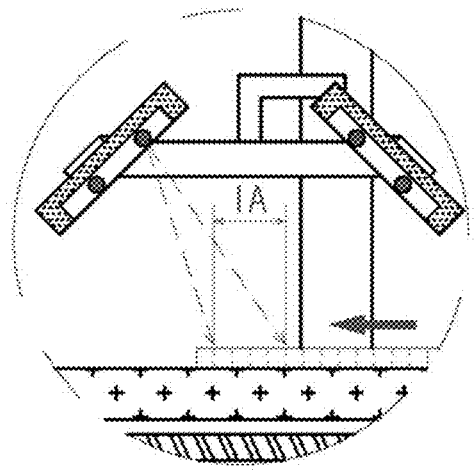
Figure 7D:
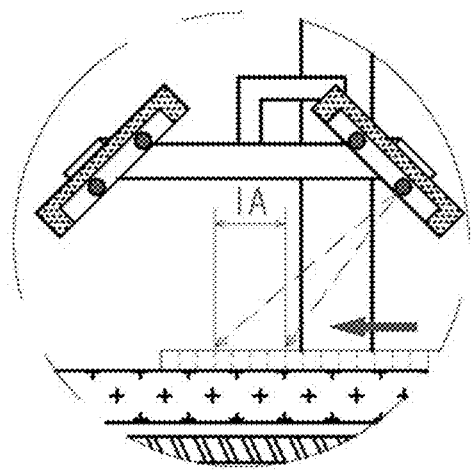
Figure 7C:
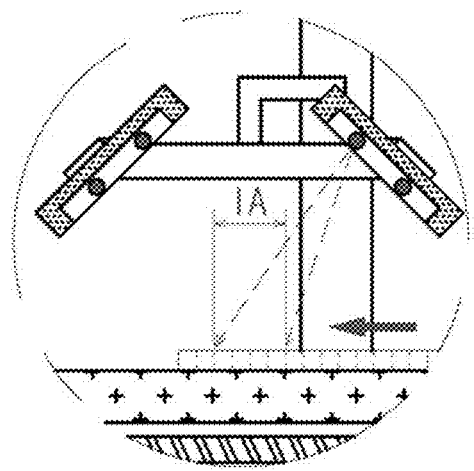

Further, FIG. 5 is an enlarged view for describing a configuration of a lighting module installed in the device for inspecting a surface defect using an image sensor illustrated in FIG. 1, FIG. 6 is a block diagram for describing an operational configuration of the device for inspecting a surface defect using an image sensor illustrated in FIG. 1, and FIGS. 7A-7D are views for describing an operation of the lighting module installed in the device for inspecting a surface defect using an image sensor illustrated in FIG. 1.

Figure 8:
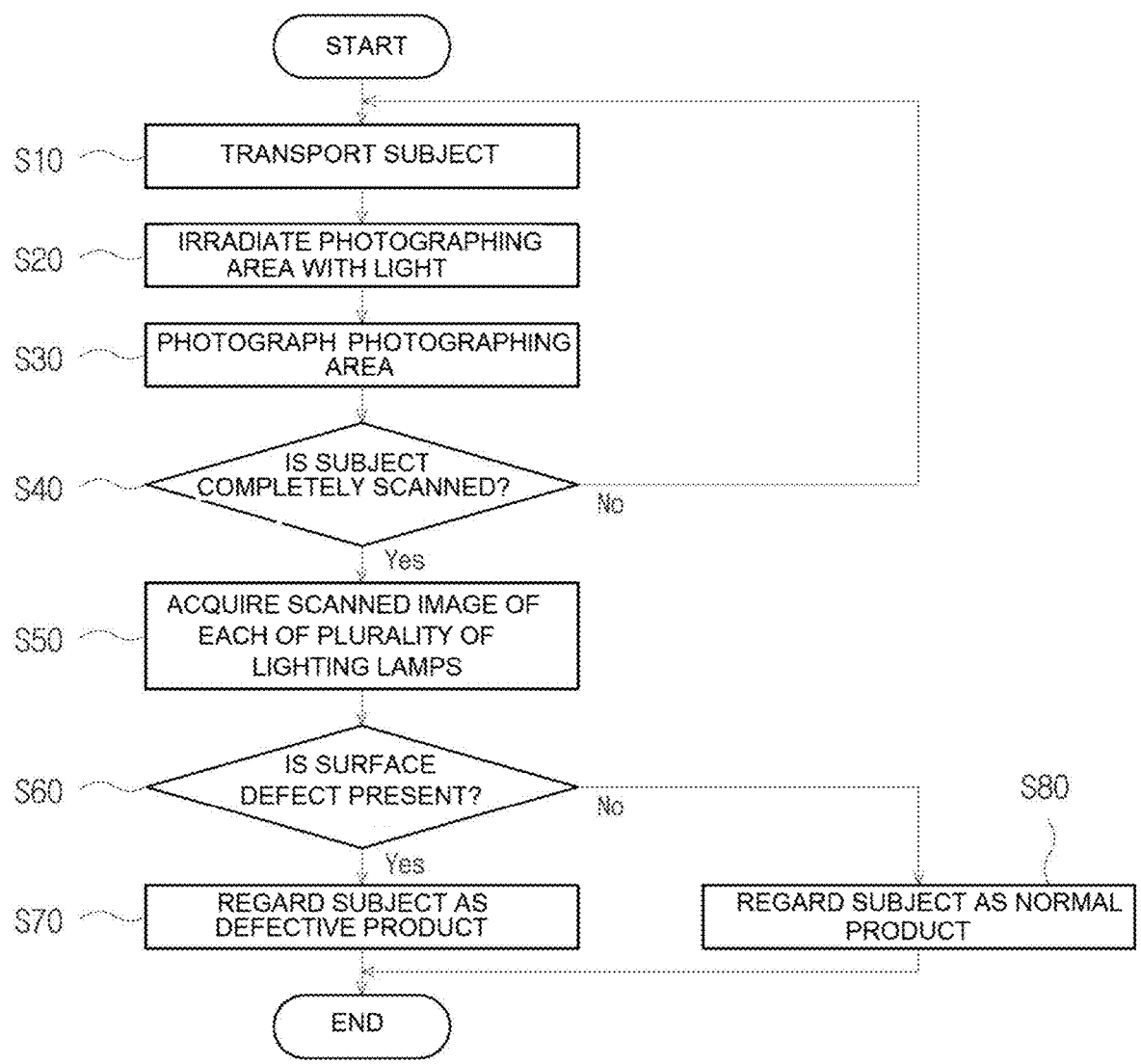
FIG. 8 is a flowchart for describing a method of inspecting a surface defect by the device for inspecting a surface defect using an image sensor illustrated in FIG. 1.
Figure 9:
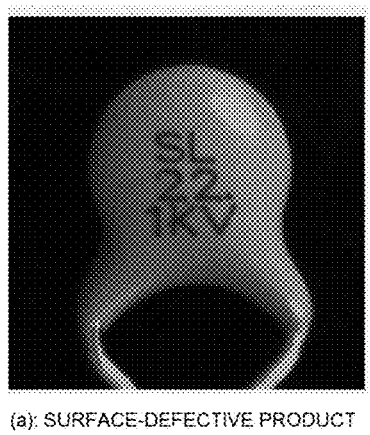
FIG. 9 illustrates a scanned image for each of a plurality of lighting lamps that is obtained by the device for inspecting a surface defect using an image sensor illustrated in FIG. 1.
Figure 9:
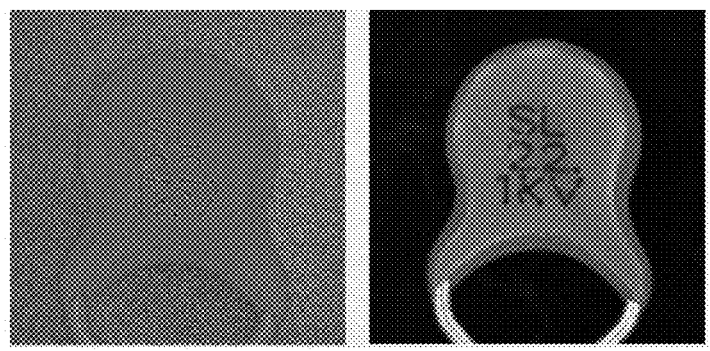
Figure 9:
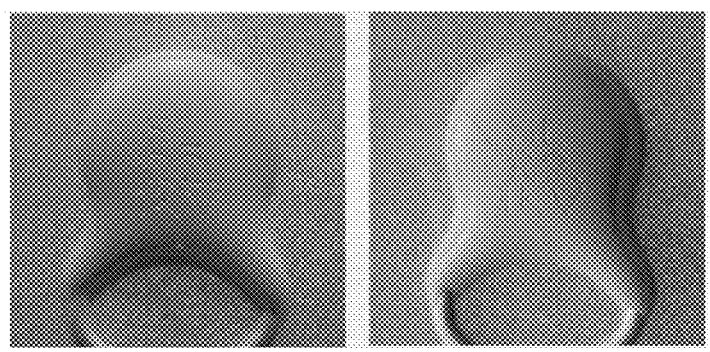

Further, FIG. 8 is a flowchart for describing a method of inspecting a surface defect by the device for inspecting a surface defect using an image sensor illustrated in FIG. 1, and FIG. 9 illustrates a scanned image for each of a plurality of lighting lamps that is obtained by the device for inspecting a surface defect using an image sensor illustrated in FIG. 1.

The device for inspecting a surface defect using an image sensor according to the present invention includes a frame part 10 that provides a transport path of a subject T, transport parts 31, 32, and 33 installed on one side of the frame part 10 and configured to transfer the subject T along the transport path, an optical module support 20 installed on one side of the frame part 10 in the middle of the transport path, and lighting units 40 and 50 and an image sensor unit 60 fixedly installed on the optical module support 20.

In this case, as an example, the frame part 10 may be configured in a table shape having an upper surface parallel to the ground and may have an opening formed in the center of the upper surface thereof to provide a transport path along which the subject T is transported in a lengthwise direction of the upper surface, which will be described below.

Further, the transport parts 31, 32, and 33 perform a function of transporting the subject T in the lengthwise direction (that is, the transport path) of the upper surface of the frame part 10. In the present embodiment, as an example, the transport parts 31, 32, and 33 may include a screw-shaped transport shaft 31 installed in the center of the upper surface of the frame part 10, a transport plate 32 which has a coupling part 32a formed on one side of the lower surface thereof and coupled to the transport shaft 31 through a central coupling hole 32b and on which the subject T is seated on the upper surface, and a transport motor 33 that rotates the transport shaft 31.

In this case, it is preferable that bearing members (not illustrated) configured to rotatably fix the transport shaft 31 are installed on both sides of the frame part 10, to which both ends of the transport shaft 31 are coupled, in the lengthwise direction.

According to the above-described configuration, in the transport parts 31, 32, and 33, while the transport shaft 31 coupled to the center of an opening in the upper surface of the frame part 10 rotates by the transport motor 33, the transport plate 32 coupled to the transport shaft 31 moves in the lengthwise direction (that is, the transport path) of the upper surface of the frame part 10, and thus the subject T seated on the upper surface of the transport plate 32 is transferred along the transfer path.

In the present embodiment, as an example, the transport parts 31, 32, and 33 are configured in a rotating screw manner by the transport motor 33 but may preferably be implemented within the range of performing the same function using any one of known transport parts such as a conveyor belt.

Further, in the drawings, for convenience of description, it is illustrated that the frame part 10 and the transport parts 31, 32, and 33 transport a single subject T. However, for quickness and work efficiency of a surface defect inspection process, it is more preferable that the frame part 10 and the transport parts 31, 32, and 33 are configured such that a plurality of subjects T are spaced apart from each other and consecutively transported.

Further, the transport motor 33 may be configured as a conventional electric motor, but it is more preferable that the transport motor 33 is configured as a stepping motor or the like that may control a rotation angle of a motor to precisely control a unit transport distance of the subject T, which will be described below.

Further, the optical module support 20 has an approximate "c" shape in which upper ends of vertical supports (not illustrated) vertical at both sides are connected by a horizontal support (not illustrated), and the vertical supports (not illustrated) are configured such that respective ends thereof are fixedly installed at both ends of the frame part 10 in an upper surface width direction.

Meanwhile, the image sensor unit 60 is installed in the middle of the transport path by being fixed to the center of the horizontal support (not illustrated) of the optical module support 20 and, according to this configuration, photographs the surface of the subject T from the upper side of the subject T transported along the transport path as described above.

In this case, the image sensor unit 60 may be preferably implemented using an image pickup device such as a charge-coupled device (CCD). In the drawings, for convenience of illustration, it is illustrated that the image sensor unit 60 has a cylindrical shape, but it is more preferable that the image sensor unit 60 is formed in a bar shape having a long length in the width direction of the subject T to photograph the entirety of the subject T, which is transported at each time of photographing, in the width direction.

Further, as described above, the image sensor unit 60 may be configured to consecutively photograph, according to a predetermined photographing period, the subjects T that are spaced apart from each other and consecutively supplied. However, as needed, the photographing may be performed using a proximity sensor (not illustrated) and the like according to a photographing period from a time when one end of the subject T approaches an area where the photographing is performed by the image sensor unit 60 to a time when the other end thereof passes through the area where the photographing is performed.

In this case, a photographing area IA of the surface of the subject T, which is an area photographed by the image sensor unit 60, may change according to characteristics of the image pickup device. For convenience of description, in the present embodiment, as an example, it is described that the photographing area IA has a length indicated by a dotted line in FIG. 2 in a transport path direction and has a length corresponding to the width (or the width of the transport plate) of the subject T in the width direction of the frame part 10.

Further, the lighting units 40 and 50 include a plurality of lighting lamps that irradiate the photographing area IA with light in different directions. In detail, the lighting units 40 and 50 include a first lighting module 43 including the plurality of lighting lamps that irradiate the photographing area IA with light in front of the image sensor unit 60, a second lighting module 46 including the plurality of lighting lamps that irradiate the photographing area IA with light behind the image sensor unit 60, and a lighting controller 50 that turns on the plurality of lighting lamps included in the first lighting module 43 and the second lighting module 46 according to a predetermined order.

In this case, the first lighting module 43 is configured in a plate shape having a length corresponding to the width of the frame part 10 and inclined from the front side of the image sensor unit 60 toward the photographing area IA, and the second lighting module 46 is configured in a plate shape having the length corresponding to the width of the frame part 10 and inclined from the rear side of the image sensor unit 60 toward the photographing area IA.

In this way, the first lighting module 43 and the second lighting module 46 configured to be symmetrical to each other in a front-rear direction (a left-right direction in the drawing) of the photographing area IA have both ends connected to each other by means of a pair of connection plates 47, and the respective connection plates 47 are fixed to the vertical support (not illustrated) of the optical module support 20 by a pair of support plates 48 and thus are installed in the middle of the transport path.

Further, the lighting controller 50 may be installed on one side of the optical module support 20, and in the present embodiment, as an example, the lighting controller 50 is fixedly installed on one side of the vertical support (not illustrated).

Further, the first lighting module 43 and the second lighting module 46 each include the plurality of lighting lamps, and in the present embodiment, for convenience of description, it is described as an example that the first lighting module 43 and the second lighting module 46 each have two lighting lamps.

That is, a first lighting lamp 41 and a second lighting lamp 42 are installed on the lower surface of the first lighting module 43 in the lengthwise direction (that is, the width direction of the frame part) to be spaced apart from each other in a vertical direction, and a third lighting lamp 44 and a fourth lighting lamp 45 are installed on the lower surface of the second lighting module 46 in the lengthwise direction (that is, the width direction of the frame part) to be spaced apart from each other in the vertical direction.

In this case, the first lighting lamp to the fourth lighting lamp 41, 42, 44, and 45 may be preferably implemented as various types of light sources, but in the present embodiment, as an example, the lighting lamps 41, 42, 44, and 45 are configured as a light-emitting diode (LED) light source.

Further, since the first lighting lamp 41 and the second lighting lamp 42 are arranged on the lower surface of the first lighting module 43 formed in an inclined flat plate shape to be spaced apart from each other in the vertical direction, a vertical incidence angle, which is an angle between a direction in which the respective lighting lamps 41 and 42 irradiate the photographing area IA with light and a direction (that is, in the drawing, a direction perpendicular to the upper surface of the transport plate) in which the image sensor unit 60 photographs the surface (that is, the photographing area) of the subject T, becomes different.

Further, in the case of the third lighting lamp 44 and the fourth lighting lamp 45 arranged on the lower surface of the second lighting module 46 to be spaced apart from each other, for the same reason, the vertical incidence angles become different from each other.

In this way, directions in which the plurality of lighting lamps 41, 42, 44, and 45 included in the first lighting module 43 and the second lighting module 46 irradiate the photographing area IA with light become different from each other.

Meanwhile, the first lighting lamp 41 and the second lighting lamp 42 installed in the first lighting module 43 have different vertical incidence angles as described above but are common in that the first lighting lamp 41 and the second lighting lamp 42 irradiate the light from the front side of the photographing area IA, and the difference in the vertical incidence angle is not large due to the layout of the lighting lamps 41 and 42. Thus, when the first lighting lamp 41 and the second lighting lamp 42 irradiate the same defect with light, it is difficult to generate a large difference between the photographed images obtained by the image sensor unit, and as a result, even though the plurality of (in the present embodiment, two) lighting lamps independently irradiate a defect to obtain a photographed image, the detection reliability of surface defects may not be greatly improved.

Thus, in order to improve this problem, in the present embodiment, as illustrated in FIG. 3, a horizontal incidence angle, which is an angle between the direction in which the first lighting lamp 41 and the second lighting lamp 42 irradiate the photographing area IA with light and the transport direction of the subject, becomes different in order to further differentiate the directions in which the first lighting lamp 41 and the second lighting lamp 42 irradiate the photographing area IA with light.

In the present embodiment, the first lighting lamp 41 is disposed to irradiate the light from the left side to the right side based on the transport direction of the subject as indicated by a dotted line in the drawing, and the second lighting lamp 42 is disposed to irradiate the light from the right side to the left side based on the transport direction of the subject as indicated by a solid line in the drawing.

Further, although not illustrated in the drawing, in the case of the third lighting lamp 44 and the fourth lighting lamp 45, for the same reason as in the first and second lighting lamps 41 and 42, the horizontal incidence angles become different from each other in the same manner.

In detail, the first lighting module 43 includes a first lamp fastening member 41a that has a sawtooth shape in which a first inclined surface and a second inclined surface facing the photographing area IA are serially connected to each other in the width direction of the frame part 10 and is installed on one front side of the image sensor unit 60, a second lamp fastening member 42a that is configured in the same structure as the first lamp fastening member 41a and is installed on one front side of the image sensor unit 60 to be spaced apart from the first lamp fastening member 41a, the first lighting lamp 41 including a plurality of LED light sources that are each coupled to the first inclined surface of the first lamp fastening member 41a, and the second lighting lamp 42 including a plurality of LED light sources that are each coupled to the second inclined surface of the second lamp fastening member 42a.

Likewise, although not illustrated, the second lighting module 46 includes a third lamp fastening member (not illustrated) that has a sawtooth shape in which a third inclined surface and a fourth inclined surface facing the photographing area IA are serially connected to each other in the width direction of the frame part 10 and is installed on one rear side of the image sensor unit 60, a fourth lamp fastening member (not illustrated) that is configured in the same structure as the third lamp fastening member (not illustrated) and is installed on one rear side of the image sensor unit 60 to be spaced apart from the third lamp fastening member (not illustrated), the third lighting lamp (not illustrated) including a plurality of LED light sources (not illustrated) that are each coupled to the third inclined surface of the third lamp fastening member (not illustrated), and the fourth lighting lamp (not illustrated) including a plurality of LED light sources (not illustrated) that are each coupled to the fourth inclined surface of the fourth lamp fastening member (not illustrated).

In this case, as described above, the configuration of the second lighting module 46 is configured to be symmetrical with the first lighting module 43 in the front-rear direction (left-right direction in the drawing) of the photographing area IA, and thus the drawing thereof will be omitted.

Further, still another modified example of the lighting unit is illustrated in FIG. 4, the first lighting lamp 41 and the second lighting lamp 42 of the first lighting module 43 and the third lighting lamp 44 and the fourth lighting lamp 45 of the second lighting module 46 are each coupled to a single lamp fastening member.

That is, as illustrated in FIG. 4, the first lighting module 43 includes a first lighting module side lamp fastening member 43a that has a sawtooth shape in which the first inclined surface and the second inclined surface facing the photographing area IA are serially connected to each other in the width direction of the frame part 10 and is installed on one front side of the image sensor unit 60, the first lighting lamp 41 including the plurality of LED light sources that are each coupled to the first inclined surface, and the second lighting lamp 42 including the plurality of LED light sources that are each coupled to the second inclined surface.

Likewise, although not illustrated, the second lighting module 46 also includes a second lighting module side lamp fastening member (not illustrated) that has a sawtooth shape in which the third inclined surface and the fourth inclined surface facing the photographing area IA are serially connected to each other in the width direction of the frame part 10 and is installed on one rear side of the image sensor unit 60, the third lighting lamp (not illustrated) including the plurality of LED light sources that are each coupled to the third inclined surface, and the fourth lighting lamp (not illustrated) including the plurality of LED light sources that are each coupled to the fourth inclined surface.

In this case, as described above, the configuration of the second lighting module 46 is configured to be symmetrical with the first lighting module 43 in the front-rear direction (left-right direction in the drawing) of the photographing area IA, and thus the drawing thereof will be omitted.

When the lighting unit according to FIG. 4 configured as described above is compared to the lighting unit according to FIG. 3 described above, the structure (specifically, the width of the first and second lighting modules) of the lighting unit may be slimmer, and thus the overall size of the device can be reduced.

As described in various modified examples discussed above, since the plurality of lighting lamps 41, 42, 44, and 45 have very different directions in which the photographing area IA is irradiated with light, a photographed image for surface defects having various types, shapes, and directions can be remarkably distinguished, and accordingly, the detection reliability for various surface defects of the subject can be greatly improved.

Meanwhile, as described below, the above-configured device for inspecting a surface defect using an image sensor according to the present invention is configured to photograph the surface of the subject T while transporting the subject T by a predetermined unit transport distance dL, and thus the photographing area is changed by the unit transport distance dL at each time of photographing.

Further, the device for inspecting a surface defect using an image sensor according to the present invention allows any one of the plurality of lighting lamps 41, 42, 44, and 45 to be turned on in a predetermined order when the image sensor unit 60 performs photographing so that the photographing area IA that is consecutively photographed is irradiated with light in different directions.

In this case, in order to obtain the scanned image of the entire surface of the subject when sequentially synthesizing the photographed image obtained at each time of photographing, it is preferable that the unit transport distance dL is set to be smaller than or equal to the length of the photographing area IA of the image sensor unit 60 in the transport direction.

In the present embodiment, as an example, the unit transport distance dL is determined as a value obtained by dividing the length of the photographing area IA in the transport direction of the subject T by the number (in the present embodiment, four) of the lighting lamps included in the first lighting module 43 and the second lighting module 46.

Thus, in the present embodiment, a process is repeatedly performed in which, as illustrated in FIGS. 7A-7D, while the subject is transported by the length of the photographing area IA in the transport direction, the first lighting lamp to the fourth lighting lamp 41, 42, 44, and 45 are sequentially turned on at each time of photographing, and the photographing area IA is irradiated.

The device for inspecting a surface defect using an image sensor according to the present invention further includes a controller 100 that controls the operations of the image sensor unit 60, the lighting controller 50, and the transport motor 33 using a timer unit 110 for the purpose of the above-described operation configuration.

In this case, the controller 100 operates a photographing operation (or a photographing period) of the image sensor unit 60 and a transport operation (or a transport period) of the subject T by the transport motor 33 in synchronization with each other so that the photographing area IA may be photographed while transporting the subject T by the unit transport distance dL.

Further, the controller 100 controls the operation of the lighting controller 50 so that any one of the plurality of lighting lamps 41, 42, 44, and 45 may irradiate the photographing area IA with light in a predetermined order at each photographing operation (or each photographing period) of the image sensor unit 60.

Further, when the entire surface of the subject T is completely photographed, the controller 100 acquires the scanned image of the entire surface of the subject T by sequentially synthesizing using an image synthesis unit 120, the photographed image obtained when the corresponding lighting lamp of each of the plurality of lighting lamps 41, 42, 44, and 45 is turned on, and determines, by a defect analysis unit 130, whether a defect is present on the surface of the object T be inspected using the scanned image acquired for each of the plurality of lighting lamps 41, 42, 44, and 45.

Next, a method of inspecting a surface defect of the subject T using the above-described device for inspecting a surface defect using an image sensor according to the present invention will be described with reference to FIG. 8.

First, the controller 100 controls the transport motor 33 to transport the subject T along the transport path by a predetermined unit transport distance dL as described above (S10). In the present embodiment, as described above, the unit transport distance dL may be set to a quarter of the length of the photographing area IA in the transport direction of the subject T.

Further, when step S10 is completed, the controller 100 controls the lighting controller 50 to turn on any one of the plurality of lighting lamps so as to irradiate the photographing area IA with light (S20). In this case, the lighting controller 50 turns on any one of the plurality of lighting lamps 41, 42, 44, and 45 according to an order stored in a memory or the like in advance so as to irradiate the photographing area with light.

In the present embodiment, as an example, as illustrated in FIGS. 7A-7D, the first lighting lamp 41, the second lighting lamp 42, the third lighting lamp 44, and the fourth lighting lamp 45 irradiate the photographing area IA with light in this order thereof at each time of photographing.

Further, when step S20 is completed, the controller 100 controls the image sensor unit 60 to obtain the photographed image by photographing the photographing area IA irradiated with the light from the top of the subject T (S30).

Further, when step S30 is completed, the controller 100 determines whether the entire surface of the subject T is completely scanned (that is, whether the photographing is completed) (S40) and repeatedly performs step S10 and the following steps when it is determined in step S40 that the scanning is not completed.

On the other hand, when it is determined in step S40 that the entire surface of the subject T is completely scanned, the controller 100 acquires the scanned image of the entire surface of the subject T by sequentially synthesizing, using the photographed image obtained in steps S10 to S40, the photographed image obtained when the corresponding lighting lamp of each of the plurality of lighting lamps 41, 42, 44, 45 is turned on (S50).

In this case, the scanned image of each lighting lamp may be made by the image synthesis unit 120, and the actual scanned image acquired for each lighting lamp by the device and method for inspecting a surface defect using an image sensor according to the present invention is illustrated on the right side of FIG. 9.

Further, when step S50 is completed, the controller 100 determines, by the defect analysis unit 130, whether a defect is present on the surface of the subject T by using the scanned image (S60) and regards the subject T as a defective product when it is determined that the defect is present (S70).

On the other hand, when it is determined in the determination result of step S60 that the defect is not present, the controller 100 regards the subject T as a normal product (S80).

In this case, as an example, the defect analysis unit 130 may determine whether the defect is present on the surface of the subject T by comparing the scanned image obtained by the image synthesis unit 120 with the previously stored scanned image of the normal product for each of the lighting lamps 41, 42, 44, and 45.

As described above, the device and method for inspecting a surface defect using an image sensor according to the present invention acquire a scanned image obtained by scanning the entire surface of the subject by photographing the surface of the subject using the image sensor while transporting the subject, are configured so that any one of the plurality of lighting lamps having different light irradiation directions is turned on in a predetermined order at each time of photographing to irradiate, with light, a photographing area photographed by the image sensor, can obtain the scanned image of the entire surface of the subject for each of the plurality of lighting lamps when the corresponding lighting lamp is turned on, and thus can improve the detection accuracy of defects having various types, shapes, or directions.

Further, the device and method for inspecting a surface defect using an image sensor according to the present invention are configured such that the entire surface of the subject is scanned when any one of the plurality of lighting lamps having different light irradiation directions is turned on in a predetermined order at each time of photographing of the image sensor. Thus, unlike the related art in which duplicated scanning is performed for a plurality of light sources, since the scanned image can be obtained for each of the plurality of lighting lamps having different light irradiation directions with only one scanning, a time consumed in inspecting the surface of the subject requiring total inspection and having a large area like secondary batteries for automobiles can be significantly reduced.

The invention claimed is:

1. A device for inspecting a surface defect using an image sensor, the device comprising:
a frame part that provides a transport path of a subject in a lengthwise direction parallel to a ground;
a transport part installed on one side of the frame part to transport the subject along the transport path;
an image sensor unit installed in a middle of the transport path to photograph a surface of the subject from an upper side of the transported subject;
a lighting unit including a plurality of lighting lamps, which irradiate a photographing area, which is an area belonging to the surface of the subject and photographed by the image sensor unit, with light in different directions, and installed in the middle of the transport path; and
a controller that controls operations of the transport part and the image sensor unit so that the photographing area is changed by a predetermined unit transport distance at each photographing by photographing the surface of the subject while moving the subject by the unit transport distance,
wherein the controller controls an operation of the lighting unit so that any one of the plurality of lighting lamps is turned on in a predetermined order when the image sensor unit performs the photographing and thus irradiates each photographing area consecutively photographed with each other with the light in the different directions,
wherein the lighting unit includes:
a first lighting module including a plurality of lighting lamps configured to irradiate the photographing area with light from a front side of the image sensor unit and installed in the middle of the transport path;
a second lighting module including a plurality of lighting lamps configured to irradiate the photographing area with light from a rear side of the image sensor unit and installed in the middle of the transport path; and
a lighting controller configured to turn on the plurality of lighting lamps included in the first lighting module and the second lighting module in the predetermined order by a control signal from the controller,
wherein the plurality of lighting lamps provided in the first lighting module are arranged to have different horizontal incidence angles that are angles between directions in which the lighting lamps irradiate light and a transport direction of the subject, and the plurality of lighting lamps provided in the second lighting module are arranged to have different horizontal incidence angles, and
wherein the first lighting module includes:
a first lighting module side lamp fastening member that has a sawtooth shape in which a first inclined surface and a second inclined surface facing the photographing area are serially connected to each other in a width direction of the frame part and is installed on the front side of the image sensor unit;
a first lighting lamp including a plurality of light emitting diode (LED) light sources that are each coupled to the first inclined surface; and
a second lighting lamp including a plurality of LED light sources that are each coupled to the second inclined surface, and
the second lighting module includes a second lighting module side lamp fastening member that has the sawtooth shape, in which a third inclined surface and a fourth inclined surface facing the photographing area are serially connected to each other in the width direction of the frame part, and is installed on the rear side of the image sensor unit, a third lighting lamp including a plurality of LED light sources that are each coupled to the third inclined surface, and a fourth lighting lamp including a plurality of LED light sources that are each coupled to the fourth inclined surface.

2. The device of claim 1, wherein the plurality of lighting lamps provided in the first lighting module are arranged to have different horizontal incidence angles that are angles between the directions in which the lighting lamps irradiate light and the transport direction of the subject, and the plurality of lighting lamps provided in the second lighting module are also arranged to have different horizontal incidence angles.

3. The device of claim 2, wherein the first lighting module includes:
a first lamp fastening member that has the sawtooth shape in which the first inclined surface and the second inclined surface facing the photographing area are serially connected to each other in the width direction of the frame part and is installed on the front side of the image sensor unit;
a second lamp fastening member that has a same structure as the first lamp fastening member and is installed on the front side of the image sensor unit to be spaced apart from the first lamp fastening member;
the first lighting lamp including the plurality of LED light sources that are each coupled to the first inclined surface of the first lamp fastening member; and
the second lighting lamp including the plurality of LED light sources that are each coupled to the second inclined surface of the second lamp fastening member, and
the second lighting module includes a third lamp fastening member that has the sawtooth shape in which the third inclined surface and the fourth inclined surface facing the photographing area are serially connected to each other in the width direction of the frame part and is installed on the rear side of the image sensor unit, a fourth lamp fastening member that has a same structure as the third lamp fastening member and is installed on the rear side of the image sensor unit to be spaced apart from the third lamp fastening member, the third lighting lamp including the plurality of LED light sources that are each coupled to the third inclined surface of the third lamp fastening member, and the fourth lighting lamp including the plurality of LED light sources that are each coupled to the fourth inclined surface of the fourth lamp fastening member.

4. The device of claim 1, wherein the unit transport distance is determined as a value obtained by dividing a length of the photographing area in the transport direction of the subject by the number of the lighting lamps included in the first lighting module and the second lighting module.

5. The device of claim 4, wherein the controller is configured to:
   acquire a scanned image of an entire surface of the subject by sequentially synthesizing photographed images obtained when a corresponding lighting lamp is turned on for each of the plurality of lighting lamps; and
   determine whether a defect is present on the surface of the subject using the scanned image obtained for each of the plurality of lighting lamps.

* * * * *